(12) United States Patent
Baba

(10) Patent No.: US 11,806,940 B2
(45) Date of Patent: Nov. 7, 2023

(54) WELDING JOINING METHOD AND WELDING JOINED BODY

(71) Applicant: TOYOTA JIDOSHA KABUSHIKI KAISHA, Toyota (JP)

(72) Inventor: Youichiro Baba, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 17/551,347

(22) Filed: Dec. 15, 2021

(65) Prior Publication Data

US 2022/0105690 A1  Apr. 7, 2022

Related U.S. Application Data

(62) Division of application No. 17/028,076, filed on Sep. 22, 2020, now Pat. No. 11,235,535.

(30) Foreign Application Priority Data

Dec. 10, 2019 (JP) .................. 2019-222893

(51) Int. Cl.
*H05B 3/00* (2006.01)
*B29C 65/14* (2006.01)
(Continued)

(52) U.S. Cl.
CPC ...... *B29C 65/1416* (2013.01); *B29C 65/1432* (2013.01); *B29C 66/5221* (2013.01); *B29C 66/71* (2013.01); *B29C 66/91411* (2013.01); *B29C 66/91443* (2013.01); *F16L 13/02* (2013.01); *H05B 1/023* (2013.01); *H05B 3/0057* (2013.01); *B29K 2677/00* (2013.01); *B29K 2995/0041* (2013.01)

(58) Field of Classification Search
CPC ................ B29C 66/5221; B29C 66/71; B29C 66/91411; B29C 65/1416; B29C 65/1432; F16L 13/02; F16L 47/02
See application file for complete search history.

(56) References Cited

U.S. PATENT DOCUMENTS

| 5,793,017 A | 8/1998 | Yamada et al. |
| 5,814,182 A | 9/1998 | McElroy, II et al. |
| 2019/0232572 A1 | 8/2019 | Ochiai et al. |

FOREIGN PATENT DOCUMENTS

| JP | 09-055287 A | 2/1997 |
| JP | 09-277381 A | 10/1997 |

(Continued)

OTHER PUBLICATIONS

Machine Translation of JP-3910567-B2 (Year: 2007).*

*Primary Examiner* — Daniel McNally
(74) *Attorney, Agent, or Firm* — Sughrue Mion, PLLC

(57) ABSTRACT

Provided is a welding joining method for joining end portions of first and second pipes made of polyamide resin by bonding the end portions to each other by pressure in a molten state. The welding joining method includes: a placing step of placing an infrared radiation lamp between the first and second pipes placed to face each other at an interval; a heating and melting step of heating and melting the end portions of the first and second pipes by emitting infrared; and a pressure bonding step of cooling down the molten end portions in a state where the molten end portions are bonded to each other by pressure.

2 Claims, 12 Drawing Sheets

(51) Int. Cl.
     *H05B 1/02*          (2006.01)
     *F16L 13/02*         (2006.01)
     *B29C 65/00*        (2006.01)
     *B29K 677/00*       (2006.01)

(56) References Cited

FOREIGN PATENT DOCUMENTS

JP        3910567 B2 *  4/2007  ............. B29C 65/14
JP        6327404 B1    5/2018

\* cited by examiner

FIG. 2
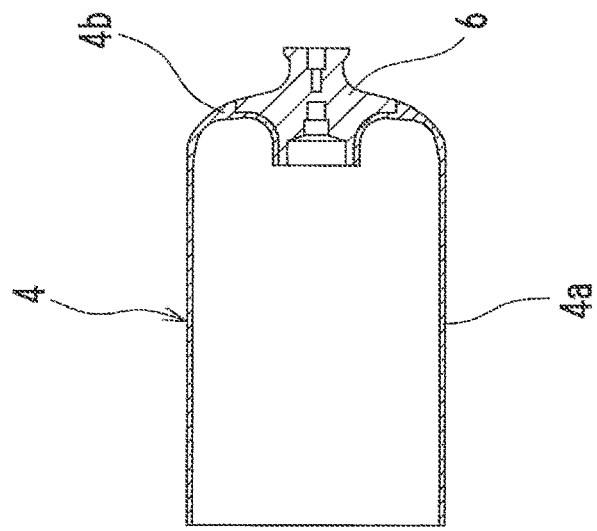
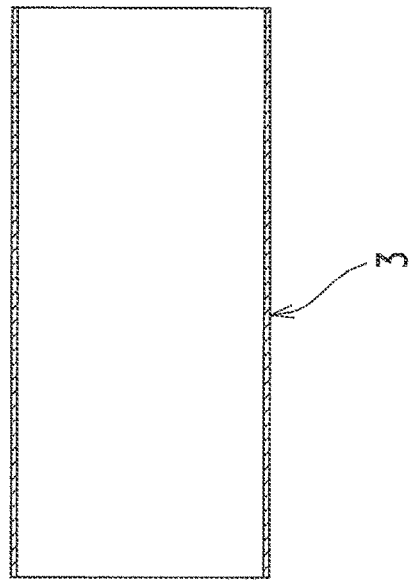
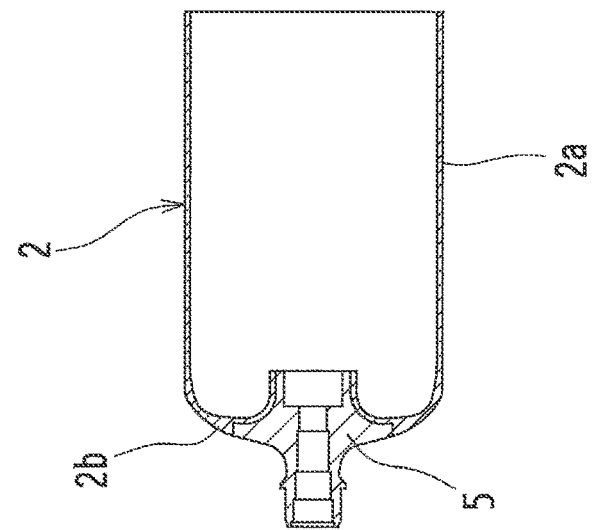

RATE OF CHANGE IN CRYSTALLINITY
(INCLINATION)

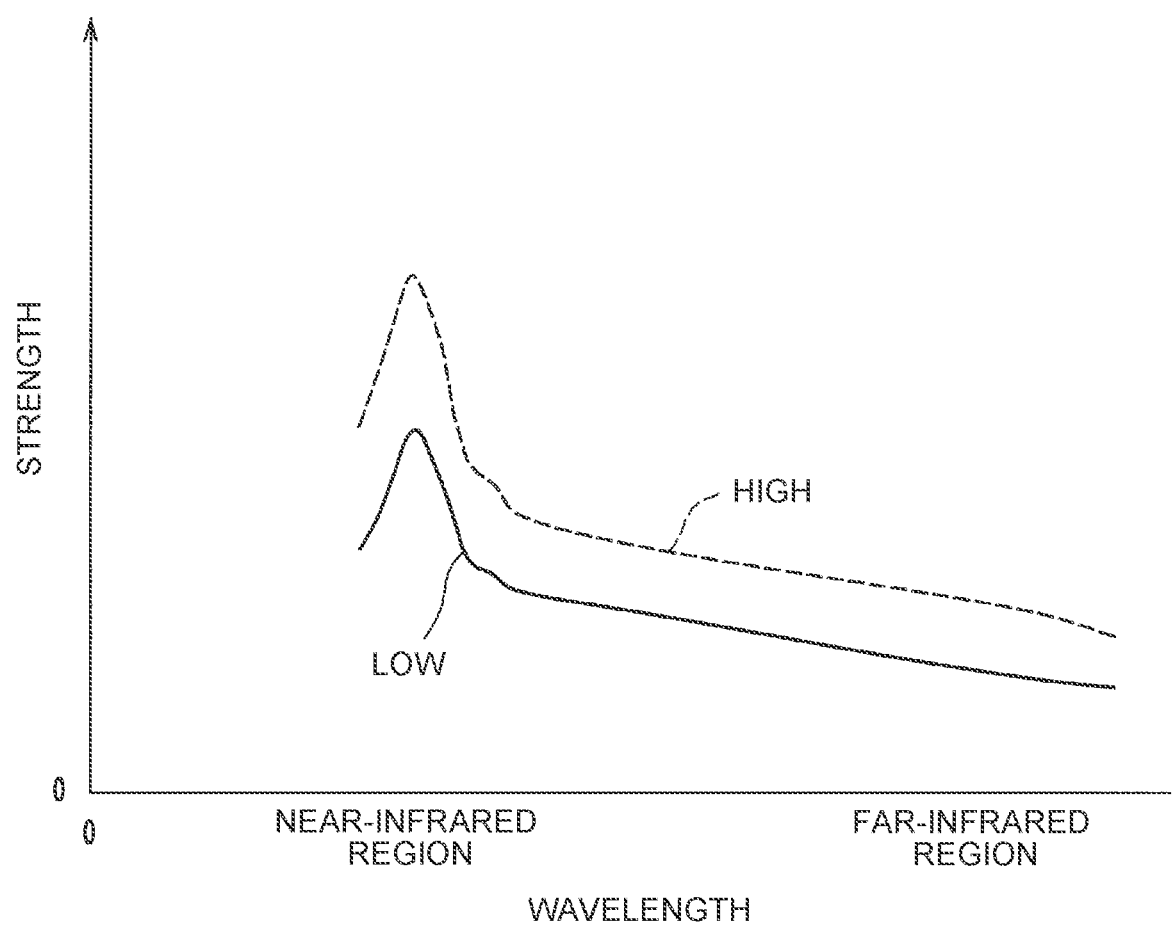

WELDING JOINING METHOD AND WELDING JOINED BODY

CROSS-REFERENCE TO RELATED APPLICATIONS

This is a divisional of U.S. patent application Ser. No. 17/028,076, filed Sep. 22, 2020, which claims priority of Japanese Patent Application No. 2019-222893 filed on Dec. 10, 2019, which is incorporated herein by reference in its entirety including the specification, claims, drawings, and abstract.

BACKGROUND

1. Technical Field

The present disclosure relates to a welding joining method for joining tubular members made of crystalline resin to each other, and a welding joined body.

2. Description of Related Art

As a method for joining resin members, there have been conventionally known joining methods in which a heat generator is placed between resin members placed such that their joining faces (end surfaces) face each other at an interval, and after the end surfaces of the resin members are heated and melted by radiant heat from the heat generator, the molten end surfaces are bonded to each other by pressure. Among such methods, a method in which respective end surfaces of resin members are heated and melted by irradiation of infrared is particularly called an infrared welding method.

As such an infrared welding method, Japanese Unexamined Patent Application Publication No. 9-277381 (JP 9-277381 A), for example, describes a technique in which, by use of a heat generator equipped with electrodes on the opposite sides of an infrared lamp, respective end surfaces of tubes made of polyvinyl chloride resin are melted by heating for one to five seconds by infrared radiated from the heat generator, and then, the tubes are pressed in the axial direction so that the end surfaces of the tubes are joined to each other.

SUMMARY

In the meantime, JP 9-277381 A also describes, as a component of the tubes (tubular members), crystalline resin such as polyamide resin and polypropylene resin, other than polyvinyl chloride resin that is noncrystalline resin.

However, in a case of a joined body (a welding joined body) formed by applying the technique described in JP 9-277381 A to tubular members made of crystalline resin, even in a seemingly excellent joined state in which a defect such as insertion of foreign matter is not found, a part slightly distanced from a joined portion may break at a relatively low tensile force.

More specifically, in a case where a tensile test (hereinafter also referred to as a "low-temperature tensile test") is performed at a low temperature (−70° C.) to evaluate the quality of a joined portion in a welding joined body made of resin other than crystalline resin, it is general that the joined portion breaks at around a yield point even if the welding joined body has an excellent joined state. Here, although a base material and the joined portion have different yield points (the yield point of the base material > the yield point of the joined portion), when the low-temperature tensile test is performed on the base material, the same behavior that breakage occurs at around the yield point is also exhibited, and this does not cause any problem in particular.

The problem is that, in a case of a welding joined body obtained by joining members made of crystalline resin by the infrared welding method, when a similar low-temperature tensile test is performed, breakage occurs in a part slightly distanced from a joined portion without causing breakage in the joined portion at a stage before the yield point of the joined portion comes (at a relatively low tensile force).

The present disclosure is accomplished in view of such a problem, and an object of the present disclosure is to provide a welding joining method and a welding joined body each of which can achieve a relatively high tensile strength even when members made of crystalline resin are joined to each other by an infrared welding method.

In order to solve the above problem, the inventors diligently repeated examination to obtain the following findings.

It is known that the crystallinity of crystalline resin is generally uniform at a stage of a member before melting (a base material), but the crystallinity becomes ununiform due to heating, pressure welding, resin flow, or the like. Further, it is also known that a part with a high crystallinity in the crystalline resin is higher in strength (rigidity) than a part with a low crystallinity.

In the crystalline resin, generally, a crystalline part melts (disappears) at a melting point or more, and crystallization does not occur at a temperature below a glass transition temperature. In the meantime, until the temperature reaches the glass transition temperature after the temperature goes below the melting point, crystallization progresses, and besides, crystals easily grow in a higher temperature state (e.g., 150° C. to 220° C.). In view of this, in the infrared welding method, respective end portions of tubular members made of the crystalline resin are brought into a relatively high temperature state, and after the end portions are bonded to each other by pressure, the tubular members are slowly cooled down to the glass transition temperature. This should result in that crystals grow sufficiently, and a uniform joined state with a relatively high strength can be obtained.

In a case where the end portions of the tubular members are melted by heating by infrared for a short time (one to five seconds), a high-strength welding joined body is not obtained as described above. Further, in the vicinity of a joined portion in the welding joined body, a relatively large difference in crystallinity (a difference in hardness) occurs. This presumably occurs because of the following reason.

That is, when the end portions of the tubular members are bonded to each other by pressure in a molten state, high-temperature oxidized resin (molten resin) discharged from the joined portion due to pressurization projects inwardly and outwardly in the tubular radial direction so as to form weld beads. At this time, the high-temperature weld beads have a relatively large volume and are easily formed into a shape folded on inner peripheral surfaces and outer peripheral surfaces of the tubular members. Accordingly, in boundary parts of the weld beads with the inner peripheral surfaces and the outer peripheral surfaces of the tubular members, heat is easily accumulated and crystals easily grow, so that the crystallinity tends to be high.

In the meantime, as described in JP 9-277381 A, in a case where the end portions of the tubular members are melted by heating by infrared for a short time (one to five seconds), the temperature distribution in the vicinity of the joined portion easily becomes ununiform. Because of this, a part on which a weld bead is folded does not reach so high a temperature although the part is close to the joined portion.

In combination of these matters, a relatively large temperature difference occurs between boundary portions of weld beads with the inner peripheral surfaces and the outer peripheral surfaces of the tubular members and other parts (particularly, parts on which the weld beads are folded), and because of this, it is considered that a relatively large difference in crystallinity (a difference in hardness) occurs in the vicinity of the joined portion of the welding joined body after cooling.

Here, among the weld beads projecting inwardly and outwardly in the tubular radial direction, the weld bead projecting outwardly in the tubular radial direction (toward the outer peripheral surface side) can be easily cut. Accordingly, the weld bead projecting toward the outer peripheral surface side is cut together with a part where a relatively large difference in crystallinity occurs in the vicinity of the weld bead, in general. On the other hand, the weld bead projecting inwardly in the tubular radial direction (toward the inner peripheral surface side) cannot be easily cut, as easily understood when a welding joined body both ends of which are closed or a welding joined body configured such that distances from both ends to a joined portion are long are assumed, for example. On this account, the weld bead projecting toward the inner peripheral surface side often remains in a welding joined body as a molded product, together with the part where a relatively large difference in crystallinity occurs in the vicinity of the weld bead.

Therefore, in the welding joined body obtained by joining members made of crystalline resin by the infrared welding method, it is considered that a relatively large difference in hardness occurs in the vicinity of the boundary portions between the weld bead and the inner peripheral surfaces of the tubular members in the vicinity of the joined portion on which stress is normally easily concentrated, so that a vulnerable portion that easily becomes a starting point of breakage remains. This is consistent with a fact that, in a case where a low-temperature tensile test is performed on a welding joined body obtained by joining members made of crystalline resin by the infrared welding method, a part slightly distanced from a joined portion breaks at a relatively low tensile force before a yield point of the joined portion comes.

If the temperature distribution in the vicinity of the joined portion at the time of heating is controlled appropriately, the temperature difference between a high-temperature weld bead and a part on which the weld bead is folded should become small, so that a relatively large difference in crystallinity (a difference in hardness) does not occur in the vicinity of the joined portion in the welding joined body after cooling, thereby resulting in that a relatively high tensile strength can be achieved even in a case where members made of crystalline resin are joined to each other.

The present disclosure is accomplished based on the above findings, and in order to achieve a relatively high tensile strength even in a case where members made of crystalline resin are joined to each other by an infrared welding method, an appropriate distribution in crystallinity in the vicinity of a joined portion in a welding joined body after cooling is achieved.

More specifically, the present disclosure aims for a welding joining method for joining end portions of tubular members made of crystalline resin by bonding the end portions to each other by pressure in a molten state.

The welding joining method includes preparing an infrared emission unit configured to change characteristics of infrared to be emitted.

The welding joining method includes: a placing step of placing the infrared emission unit between the end portions of the tubular members, the end portions being placed to face each other at an interval in a tubular axial direction; a heating and melting step of heating and melting the end portions of the tubular members by emitting the infrared from the infrared emission unit; and a pressure bonding step of cooling down the molten end portions of the tubular members in a state where the end portions are bonded to each other by pressure. In the heating and melting step, the characteristics of the infrared emitted from the infrared emission unit are controlled so that a crystallinity along a tubular radial direction in a region starting from a boundary portion in a welding joined body after cooling does not suddenly change, the boundary portion being a part between a peripheral surface of a corresponding one of the tubular members and a weld bead discharged from a joined portion in pressure bonding such that the weld bead projects in the tubular radial direction.

When the characteristics of the infrared to be emitted, namely, the property of the infrared (e.g., the wavelength of the infrared) and the state of the infrared (e.g., the strength of the infrared) are changed, it is possible to adjust entry of heat (heat input range, heat input speed, strength and weakness of heat input, and so on) to an irradiation target object. Accordingly, with this configuration, by adjusting a temperature distribution in the vicinity of the joined portion at the time of heating by controlling the characteristics of the infrared to be emitted from the infrared emission unit, it is possible to create a heating state where the crystallinity along the tubular radial direction in the region from the boundary portion in the welding joined body after cooling does not suddenly change, the boundary portion being a part between the weld bead and the peripheral surface of the tubular member.

As such, if the crystallinity in the vicinity of the joined portion in the welding joined body after cooling does not suddenly change, in other words, if a relatively large difference in hardness does not occur in the vicinity of the joined portion, a vulnerable portion to become a starting point of breakage at a stage before a yield point comes is not formed in the vicinity of the joined portion. Accordingly, even in a case where members made of crystalline resin are joined to each other by the infrared welding method, it is possible to achieve a relatively high tensile strength.

In the meantime, high-strength (high-output) infrared rapidly increases the surface temperature of joining surfaces and achieves a high-quality joined state. However, when an irradiation time of the high-strength (high-output) infrared becomes long, an area near the joined portion may be also melted (turn into a liquid phase) as well as the joined portion in some cases. Therefore, the high-output infrared only can transmit heat shallowly in a short time, so that a temperature difference between the joining surfaces and their vicinal area becomes large, and a temperature distribution in the vicinity of the joined portion becomes ununiform. This causes such a problem that the crystallinity in the vicinity of the joined portion suddenly changes as described above.

In the meantime, low-strength (low-output) infrared can hardly cause a liquid phase even if its irradiation time becomes long. Accordingly, the low-strength (low-output) infrared can transmit heat for a long time to some extent, so that the temperature distribution in the vicinity of the joined portion becomes uniform. However, energy density of the low-strength (low-output) infrared is low, and the surface temperature of the joining surfaces is hard to increase. This causes such a problem that a high-quality joined state cannot be obtained.

In view of this, as examples of the infrared emission unit and the control of the characteristics (state) of the infrared, in the above welding joining method, the infrared emission unit may be an infrared radiation lamp configured to change an output of the infrared to be emitted from a low output to a high output by changing a power supply amount. Further, the heating and melting step may include: a heating step of heating the end portions of the tubular members by emitting low-output infrared from the infrared radiation lamp for a first predetermined time; and a melting step of, after the heating step, melting the end portions of the tubular members by emitting high-output infrared from the infrared radiation lamp for a second predetermined time.

In this configuration, at the time when the end portions of the tubular members are heated, low-output infrared is used at an early stage by reducing a power supply amount to the infrared radiation lamp so that heat is deeply passed through the end surfaces (joining surfaces) of the tubular members in the vertical direction for a longer time to some extent. After that, the power supply amount to the infrared radiation lamp is increased so that the joining surfaces are melted at a stretch by high-output infrared. Hereby, in the welding joined body after cooling, the crystallinity can be made almost uniform in a wide range in the vicinity of the joined portion, and a high-quality joined state can be obtained.

Note that "high-output" and "low-output" are relative concepts and vary depending on the type of crystalline resin or the size of the tubular members. However, an example of "high-output" can be an output of about 80% of the maximum output of the infrared radiation lamp, and an example of "low-output" can be an output of about 40% of the maximum output of the infrared radiation lamp.

As an example of the irradiation times, in the welding joining method, the first predetermined time may be 60 to 90 seconds, and the second predetermined time may be 5 to 30 seconds.

In this configuration, with such a simple configuration that high-output infrared is emitted to the end portions of the tubular members for 5 to 30 seconds after low-output infrared is emitted thereto for 60 to 90 seconds, it is possible to achieve uniform crystallinities in the vicinity of the joined portion in the welding joined body after cooling and to achieve a relatively high tensile strength by creating a high-quality joined state.

In the meantime, the infrared emitted from the infrared radiation lamp is not constituted by a single waveband and includes various long and short wavebands regardless of whether the infrared is low-output infrared or high-output infrared. The infrared emitted from the same infrared radiation lamp has a peak at generally the same waveband regardless of whether the output of the infrared is high or low.

In the high-output infrared that melts the joining surfaces, the ratio of the short waveband tends to be relatively high. In the meantime, in the low-output infrared that uniformizes the temperature distribution in the vicinity of the joined portion, the ratio of the long waveband tends to be relatively high. Further, it is known that near-infrared having a relatively short wavelength shallowly and quickly passes heat through an irradiation target object so that the surface temperature of the irradiation target object is raised rapidly, whereas far-infrared having a relatively long wavelength can deeply and slowly pass heat through the irradiation target object.

In view of this, regardless of whether the output of the infrared is high or low, if far-infrared is applied to the end portions of the tubular members, the temperature distribution in the vicinity of the joined portion can be made uniform. In the meantime, if near-infrared is applied to the end portions of the tubular members, the joining surfaces (the end surfaces) can be melted at a stretch, so that a high-quality joined state should be obtained.

In view of this, as examples of the infrared emission unit and the control of the characteristics (the property) of the infrared, in the welding joining method, the infrared emission unit may be configured to change a peak of a wavelength of the infrared to be emitted from a near-infrared region to a far-infrared region. The heating and melting step may include: a heating step of heating the end portions of the tubular members by mainly emitting far-infrared from the infrared emission unit for a predetermined time; and a melting step of, after the heating step, melting the end portions of the tubular members by mainly emitting near-infrared from the infrared emission unit for a time shorter than the predetermined time.

In this configuration, at the time when the end portions of the tubular members are heated, heating is performed for the predetermined time mainly by far-infrared at an early stage, so that heat is deeply passed through the end surfaces (joining surfaces) of the tubular members in the vertical direction. After that, the joining surfaces are melted by heating mainly by near-infrared for a time shorter than the predetermined time. Hereby, in the welding joined body after cooling, the crystallinity can be made almost uniform in a wide range in the vicinity of the joined portion, and a high-quality joined state can be obtained.

Further, in the above welding joining method, in each of the end portions of the tubular members, a heating range heated in the heating step may be wider than a melting range melted in the melting step.

In this configuration, a part of the heating range heated by the low-output infrared (or far-infrared) and having a uniform temperature distribution is melted by the high-output infrared (or near-infrared). Accordingly, it is possible to achieve uniform crystallinities in the vicinity of the joined portion in the welding joined body after cooling and to create a high-quality joined state.

The welding joined body obtained by the welding joining method of the present disclosure has the following features.

That is, the welding joined body is a welding joined body including a joined portion obtained by bonding, by pressure, end portions of tubular members made of crystalline resin to each other in a molten state. A weld bead remains in the vicinity of the joined portion, the weld bead being discharged from the joined portion in pressure bonding such that the weld bead projects inwardly in a tubular radial direction. A rate of change in crystallinity in the tubular radial direction in a belt-shaped predetermined region extending outwardly in the tubular radial direction when the predetermined region is viewed in a circumferential direction is a predetermined value or less, the predetermined region being set in a corresponding one of the tubular members so as to start from a boundary portion between the weld bead and an inner peripheral surface of the corresponding one of the tubular members.

In this configuration, when the rate of change in crystallinity in the tubular radial direction in the belt-shaped predetermined region is the predetermined value or less, it can be said that a relatively large difference in hardness does not occur in the vicinity of the joined portion, that is, a vulnerable portion that easily becomes a starting point of breakage does not remain. The belt-shaped predetermined region is a region starting from the boundary portion between the weld bead and the inner peripheral surface of the corresponding one of the tubular members. The belt-shaped predetermined region is a part where the crystallinity easily increases. Hereby, it is possible to achieve the welding joined body having a relatively high tensile strength.

Note that the predetermined value is a value determined in advance based on experiment, experience, or the like. The predetermined value is a value that allows the tensile breaking strength of the welding joined body to be 60% or more of the tensile breaking strength of a base material, for example, provided that the rate of change in crystallinity in the tubular radial direction in the predetermined region is the predetermined value or less.

Further, in the welding joined body, when a belt-shaped region extending in the tubular radial direction when the belt-shaped region is viewed in the circumferential direction is taken as a large region, the belt-shaped region being set in the corresponding one of the tubular members so as to include the boundary portion between the weld bead and the inner peripheral surface of the corresponding one of the tubular members, a plurality of regions obtained by equally dividing the large region in the tubular radial direction is taken as medium regions, a plurality of regions obtained by equally dividing each of the medium regions in a tubular axial direction such that the regions are arranged in the tubular axial direction is taken as small regions, and a value obtained by adding up crystallinities of the small regions included in the each of the medium regions is taken as a crystallinity of the each of the medium regions, the predetermined region may be set in a range, in the large region, which starts from the boundary portion and in which crystallinities of the medium regions linearly change in the tubular radial direction. The rate of change in crystallinity may be an inclination of an approximate straight line obtained by linearly approximating the crystallinities changing linearly within the predetermined region.

With this configuration, it is possible to objectively and clearly determine whether or not the welding joined body has a relatively high tensile strength based on whether or not the inclination of the approximate straight line is a predetermined value or less.

As described above, with the welding joining method and the welding joined body according to the present disclosure, it is possible to achieve a relatively high tensile strength even in a case where members made of crystalline resin are joined to each other by an infrared welding method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a sectional view schematically illustrating domes and a pipe constituting the liner;

FIG. 16 is a graph illustrating a relationship between wavelength and strength in an infrared radiation lamp.

DETAILED DESCRIPTION OF EMBODIMENTS

With reference to the drawings, the following describes embodiments to carry out the present disclosure.

Embodiment 1

Figure 1:
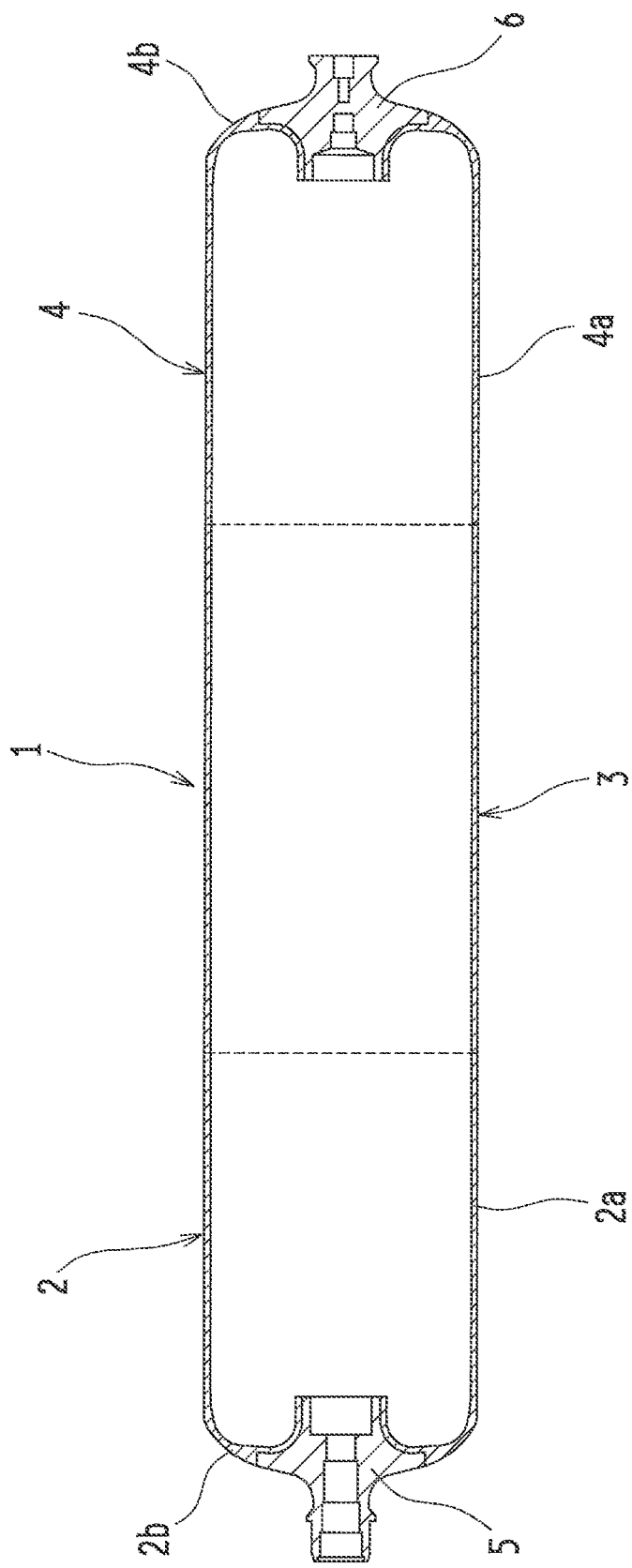
FIG. 1 is a sectional view schematically illustrating a liner as one example of a welding joined body obtained by a welding joining method according to Embodiment 1 of the present disclosure.

FIG. 1 is a sectional view schematically illustrating a liner 1 as one example of a welding joined body obtained by a welding joining method according to the present embodiment, and FIG. 2 is a sectional view schematically illustrating domes 2, 4 and a pipe 3 constituting the liner 1. As illustrated in FIG. 1, the liner 1 is formed in a generally cylindrical shape and constitutes an inner shell of a high-pressure tank (not shown) such that mouth pieces 5, 6 made of aluminum are assembled to the opposite ends of the liner 1 by press-fitting, and carbon fiber (not shown) is wound and laminated around an outer periphery of the liner 1.

As illustrated in FIG. 2, the liner 1 is constituted by two domes 2, 4, and one pipe 3 each made of polyamide resin that is crystalline resin. The domes (tubular members) 2, 4 are manufactured by injection molding and include cylindrical portions 2a, 4a, and semispherical dome portions 2b, 4b provided to close one ends of the cylindrical portions 2a, 4a. The mouth pieces 5, 6 are assembled to the dome portions 2b, 4b, respectively. The domes 2, 4 are formed in a bottomed tubular shape. In the meantime, the pipe (tubular member) 3 is manufactured by injection molding and is formed in a cylindrical shape the opposite ends of which are opened. The liner 1 is configured such that the pipe 3 is sandwiched between the two domes 2, 4 and joined to the two domes 2, 4 in the axial direction.

Note that the welding joining method of the present embodiment is not limited to joining of the domes 2, 4 to the pipe 3 and is applicable to joining of tubular members made of the crystalline resin to each other. Accordingly, in the following description, the domes 2, 4 are taken as a first pipe 10 (see FIG. 3), the pipe 3 is taken as a second pipe 20 (see FIG. 3), and an object obtained by joining them in the axial direction is taken as a welding joined body 30 (see FIG. 4).

Note that examples of the crystalline resin constituting the first and second pipes 10, 20 include polypropylene resin (PP), polyacetal resin (POM), polybutylene terephthalate resin (PBT), polyphenylene sulfide resin (PPS), and so on, other than polyamide resin (PA).

Welding Joining Method

Figure 3:
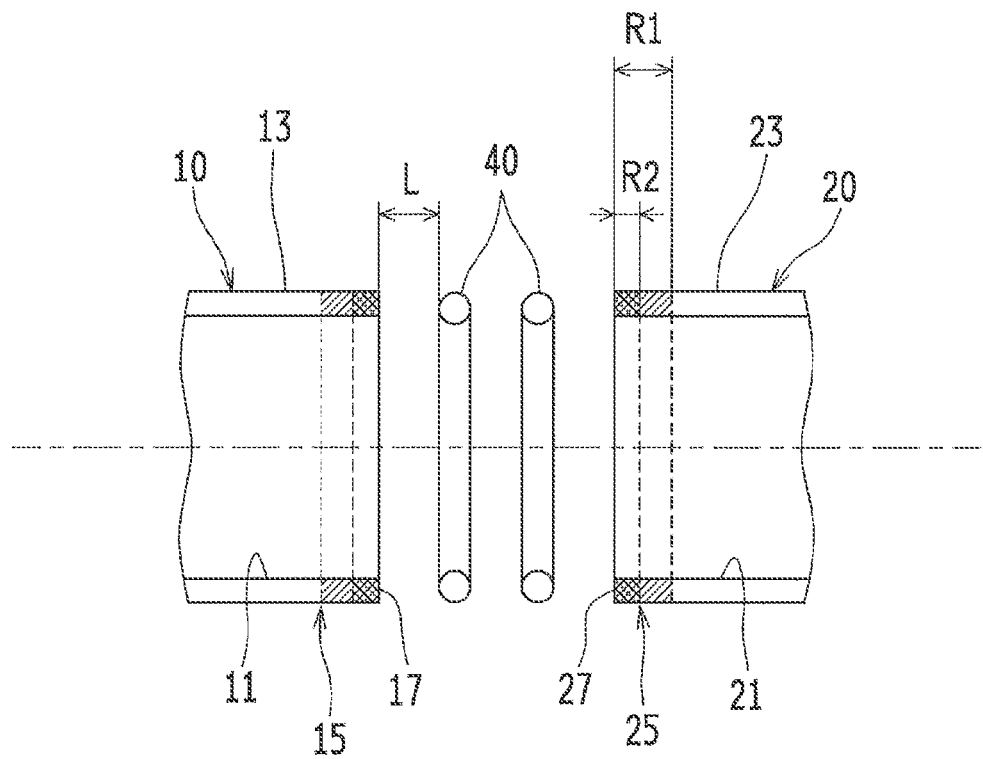
FIG. 3 is a view to schematically describe a heating and melting step in the welding joining method.
Figure 4:
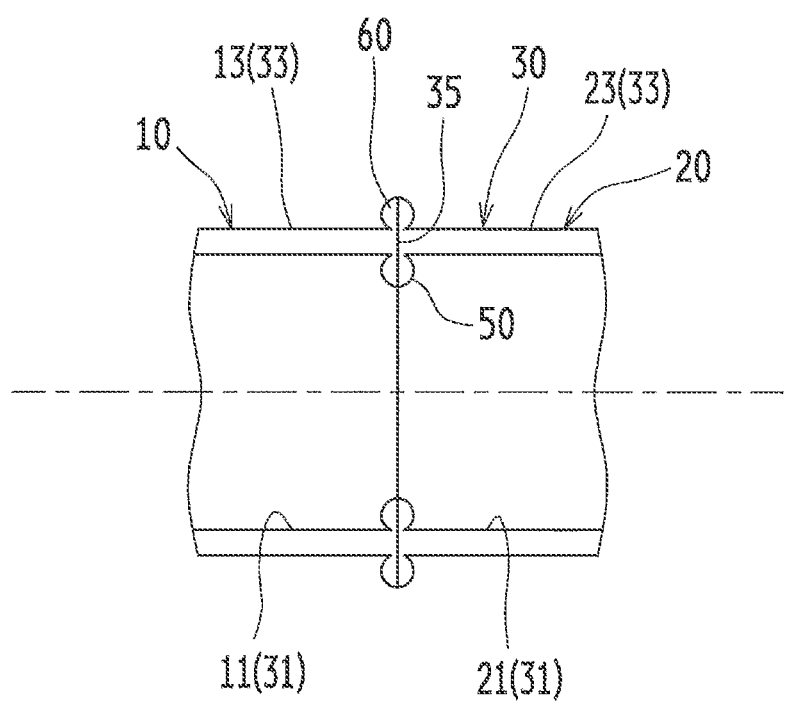
FIG. 4 is a view to schematically describe a pressure bonding step in the welding joining method.

FIG. 3 is a view to schematically describe a heating and melting step in the welding joining method, and FIG. 4 is a view to schematically describe a pressure bonding step in the welding joining method. Note that FIGS. 3 and 4 are sectional views, but hatching indicative of a section is omitted for easy understanding of those figures.

The welding joining method of the present embodiment is to join an end portion 15 of the first pipe 10 to an end portion 25 of the second pipe 20 by pressure bonding in a semi-solid molten state. Particularly, the welding joining method of the present embodiment belongs to an infrared welding method in which the end portions 15, 25 of the first and second pipes 10, 20 are heated and melted by applying infrared to the end portions 15, 25. The following describes the welding joining method of the present embodiment in detail.

The welding joining method includes a placing step, a heating and melting step, a pressure bonding step, and a cutting step. As illustrated in FIG. 3, in the welding joining method, a generally toric infrared radiation lamp (infrared emission unit) 40 is prepared. The infrared radiation lamp 40 is configured to change an output of infrared to be emitted by increasing and decreasing (changing) a power supply amount.

First, in the placing step, the infrared radiation lamp 40 is placed between the end portion 15 of the first pipe 10 and the end portion 25 of the second pipe 20, the end portion 15 and the end portion 25 being placed to face each other at an interval in a tubular axial direction, as illustrated in FIG. 3. Note that a distance L between an end surface 17 of the first pipe 10 and the infrared radiation lamp 40 is about 10 mm, for example, and a distance between an end surface 27 of the second pipe 20 and the infrared radiation lamp 40 is also set to the same distance. The orientations and the distances L of the infrared radiation lamp 40 to the first and second pipes 10, 20 are maintained to be uniform during the placing step and the heating and melting step.

In the subsequent heating and melting step, infrared is emitted from the infrared radiation lamp 40 so as to heat and melt the end portions 15, 25 of the first and second pipes 10, 20, as illustrated in FIG. 3. Note that the heating and melting step will be described later more specifically in separate sections.

In the subsequent pressure bonding step, after the infrared radiation lamp 40 is removed from between the first pipe 10 and the second pipe 20, the end portion 15 of the first pipe 10 and the end portion 25 of the second pipe 20 that are brought into a semi-solid molten state are cooled down in a state where the end portion 15 and the end portion 25 are bonded to each other by pressure, as illustrated in FIG. 4. Thus, a welding joined body 30 having a joined portion 35 is molded. More specifically, joining surfaces (end surfaces) 17, 27 of the molten first and second pipes 10, 20 are brought into close contact with each other for a sufficiently short time (e.g., within two seconds) after heating is completed, and then, the joining surfaces 17, 27 are cooled down at a room temperature to around a glass transition temperature (TG point≈60° C.) of polyamide resin for 50 or more seconds in a state where they are pressurized at about 5 kN. At the time when the end portions 15, 25 of the first and second pipes 10, 20 are bonded to each other by pressure, oxidized (burnt) resin generated by heating is discharged to front and back surfaces of the joined portion 35, and only newly-generated resin remains in the joined portion 35 of the welding joined body 30. In the welding joined body 30, weld beads 50, 60 are formed by the oxidized resin (molten resin) discharged on an inner peripheral surface 31 side and an outer peripheral surface 33 side, as illustrated in FIG. 4.

In the subsequent cutting step, the weld bead 60 formed on the outer peripheral surface 33 of the welding joined body 30 (outer peripheral surfaces 13, 23 of the first and second pipes 10, 20) is cut. Hereby, one elongated welding joined body 30 with the flat outer peripheral surface 33 is finished. Note that the weld bead 50 formed on the inner peripheral surface 31 of the welding joined body 30 (inner peripheral surfaces 11, 21 of the first and second pipes 10, 20) remains.

Heating and Melting Step

Figure 5:
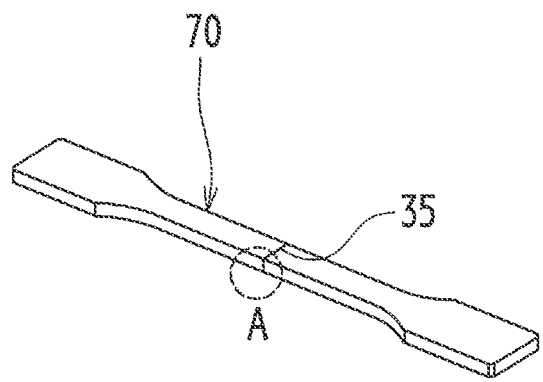
FIG. 5 is a perspective view schematically illustrating a shape of a test piece targeted for a tensile test.

FIG. 5 is a perspective view schematically illustrating a shape of a test piece 70 targeted for a tensile test. In a case where the quality of the joined portion 35 in the welding joined body 30 is evaluated, it is general to cut the test piece 70 in a HS A-type dumbbell shape including the joined portion 35 and to perform the tensile test (hereinafter also referred to as a "low-temperature tensile test") at a low temperature (−70° C.), as illustrated in FIG. 5. In a case where such a low-temperature tensile test is performed on a test piece made of resin other than the crystalline resin, for example, the joined portion 35 often breaks at around a yield point even if the joined portion 35 has an excellent joined state.

On the other hand, in a case where a similar low-temperature tensile test is performed on the test piece 70 made of the crystalline resin and having an end surface melted by infrared for a short time (e.g., one to five seconds), even if the joined portion 35 is in a seemingly excellent joined state in which a defect such as insertion of foreign matter is not found, breakage often occurs in a part slightly distanced from the joined portion 35 without causing breakage in the joined portion 35 itself, at a stage before the yield point comes (at a relatively low tensile force). The reason why the part slightly distanced from the joined portion 35 breaks at a relatively low tensile force is presumably as follows.

Figure 6:
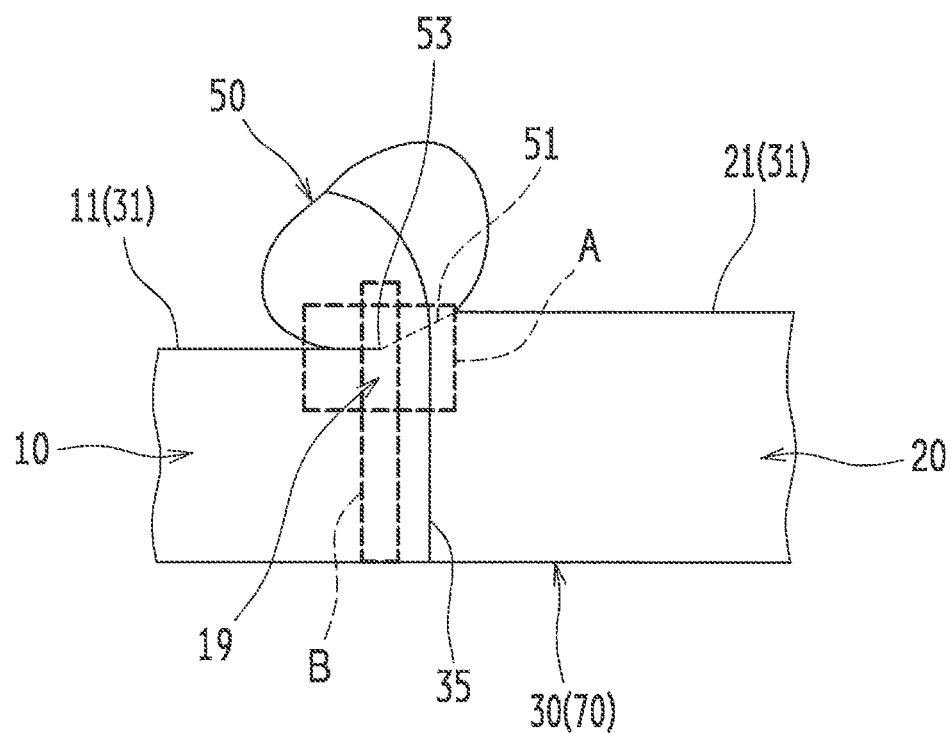
FIG. 6 is an enlarged view schematically illustrating a part A in FIG. 5.
Figure 7:
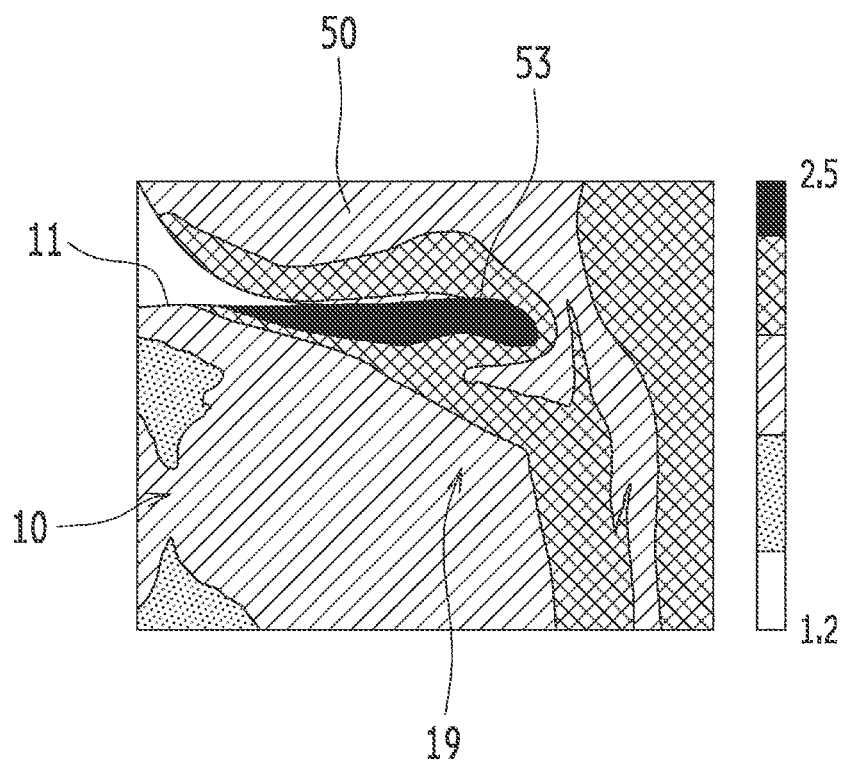
FIG. 7 is a view to schematically describe the crystallinity distribution corresponding to a bold broken line frame A in FIG. 6.
Figure 8:
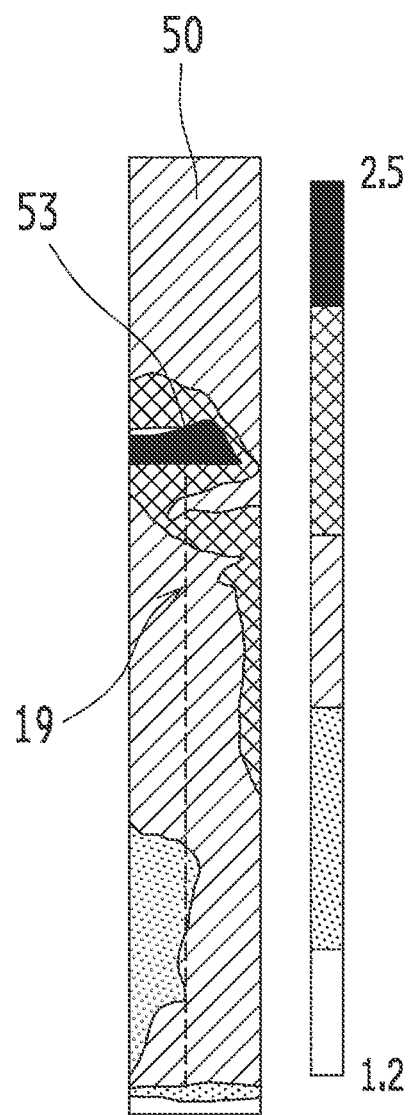
FIG. 8 is a view to schematically describe the crystallinity distribution corresponding to a bold broken line frame B in FIG. 6.

FIG. 6 is an enlarged view schematically illustrating a part A in FIG. 5, FIG. 7 is a view to schematically describe the crystallinity distribution corresponding to a bold broken line frame A in FIG. 6, and FIG. 8 is a view to schematically describe the crystallinity distribution corresponding to a bold broken line frame B in FIG. 6. Note that, in FIGS. 7 and 8, for easy understanding of the figures, the crystallinity is divided into five levels to be illustrated in a simplified manner, but the actual crystallinity changes in dozens of levels. Further, in FIGS. 7 and 8, the crystallinity is expressed to become smaller in order of a black part, a cross-hatching part, an oblique hatching part, a dot hatching part, and a while part.

As described above, the weld bead 50 formed by molten resin discharged from the joined portion 35 in pressure bonding projects inwardly in a tubular radial direction of the welding joined body 30 as illustrated in FIG. 6. The weld bead 50 remains in a shape where the weld bead 50 falls down toward the first pipe 10 side from a boundary portion 53 between a root 51 of the weld bead 50 and the inner peripheral surface 11 of the first pipe 10 and is folded on the inner peripheral surface 11 of the first pipe 10.

In the meantime, it is known that the crystallinity of the crystalline resin is generally uniform at a stage of a member before melting (a base material), but the crystallinity becomes ununiform by heating, pressure welding, resin flow, or the like. Further, it is also known that a part with a high crystallinity in the crystalline resin is higher in strength (rigidity) than a part with a low crystallinity.

In the crystalline resin, generally, a crystalline part melts at a melting point or more, and crystallization does not occur at a temperature below a glass transition temperature. In the meantime, crystallization progresses after the temperature goes below the melting point until the temperature reaches the glass transition temperature, and besides, crystals easily grow in a higher temperature state (e.g., 150° C. to 220° C.).

Here, the molten resin discharged from the joined portion 35 in pressure bonding and constituting the weld bead 50 has a high temperature, and the weld bead 50 having such a high temperature has a relatively large volume and is folded on the inner peripheral surface 11 of the first pipe 10 as illustrated in FIG. 6. On this account, heat is easily accumulated and crystals easily grow in the boundary portion 53 between the inner peripheral surface 11 of the first pipe 10 and the weld bead 50 (the boundary portion 53 between the inner peripheral surface 11 and the root 51 of the weld bead 50). Accordingly, the crystallinity tends to be high as indicated by the black part in FIG. 7.

On the other hand, in a part 19, in the first pipe 10, on which the weld bead 50 is folded, in a case where the end surfaces 17, 27 of the first and second pipes 10, 20 are melted by infrared radiation for a short time, the temperature distribution is ununiform. Although the part 19 is close to the joined portion 35, the temperature of the part 19 is not so high. On this account, as illustrated in FIG. 7, in the part 19 on which the weld bead 50 is folded, the crystallinity tends to be low as compared with the weld bead 50 itself.

In combination of these points, in a welding joined body obtained by joining the end surfaces 17, 27 by melting them by infrared for a short time, a temperature difference in the tubular radial direction in a region starting from the boundary portion 53 between the inner peripheral surface 11 of the first pipe 10 and the weld bead 50 in pressure bonding tends to be large. As a result, in the welding joined body after it is cooled down to the glass transition temperature, it is considered that the crystallinity along the tubular radial direction in the region starting from the boundary portion 53 suddenly changes.

Therefore, in the welding joined body obtained by joining the end surfaces 17, 27 of the first and second pipes 10, 20 by melting the end surfaces 17, 27 by infrared for a short time, it is considered that a vulnerable portion remains due to occurrence of a relatively large difference in hardness in the vicinity of the joined portion 35 on which stress easily concentrates, particularly around the boundary portion 53. The vulnerable portion easily serves as a starting point of breakage (on which stress more easily concentrates). This is consistent with a fact that, in a case where the low-temperature tensile test is performed on the test piece 70 made of crystalline resin and obtained by joining the end surfaces by melting them by infrared for a short time, a part slightly distanced from the joined portion 35 breaks at a relatively low tensile force before the yield point of the joined portion 35 comes.

In view of this, in the present embodiment, in order to achieve a relatively high tensile strength even in a case where the first and second pipes 10, 20 made of crystalline resin are joined to each other by the infrared welding method, an appropriate crystallinity distribution in the vicinity of the joined portion 35 is achieved.

More specifically, in the welding joining method of the present embodiment, the output of infrared in the heating and melting step is controlled so that the crystallinity (see a broken line in FIG. 8) along the tubular radial direction in the region starting from the boundary portion 53 does not suddenly change in the welding joined body 30 after cooling. The boundary portion 53 is a part between the inner peripheral surface 11 of the first pipe 10 and the weld bead 50 discharged from the joined portion 35 in pressure bonding so as to project inwardly in the tubular radial direction.

Here, a preferable heating technique is a technique in which, at an early stage, the end portions 15, 25 of the first and second pipes 10, 20 are warmed deeply and slowly by low-output infrared by taking a longer time so that a region around the joined portion 35 (more specifically a part to become the joined portion 35) is heated widely, and after the target region has a uniform temperature, the end surfaces 17, 27 of the first and second pipes 10, 20 are melted and joined to each other rapidly (at a stretch) by high-output infrared.

Therefore, the heating and melting step in the welding joining method of the present embodiment includes a heating step and a melting step. In the heating step, the end portions 15, 25 of the first and second pipes 10, 20 are heated by emitting low-output infrared from the infrared radiation lamp 40 for a first predetermined time. Meanwhile, in the melting step, after the heating step, the end surfaces 17, 27 of the first and second pipes 10, 20 are melted by emitting high-output infrared from the infrared radiation lamp 40 for a second predetermined time.

More specifically, in a case where the first pipe 10 and the second pipe 20 each made of polyamide resin having a plate thickness of 4 mm (with a melting point of 273° C. and a glass transition temperature of 60° C.) are brought into contact with each other and joined to each other, low-output infrared (an output of 40% of the maximum output of the infrared radiation lamp 40) is first emitted from the infrared radiation lamp 40 for about 80 seconds (the first predetermined time), so that a range (a heating range R1) of about 4 mm from the end surfaces 17, 27 is heated to 200° C. to 250° C. Subsequently, a power supply amount to the infrared radiation lamp 40 is increased to switch to high-output infrared (an output of 80% of the maximum output of the infrared radiation lamp 40), and heating is performed for about five seconds (the second predetermined time). Hereby, the temperature of the end surfaces 17, 27 exceeds 300° C. so that a range (a melting range R2) of 2 mm melts.

After that, the molten end surfaces 17, 27 of the first and second pipes 10, 20 are brought into close contact with each other in two seconds after heating is completed, as described above. At this time, molten resin having a temperature of more than 300° C. and discharged from the joined portion 35 is turned into the weld bead 50 and folded on the inner peripheral surface 11 of the first pipe 10. Since the part 19 on which the weld bead 50 is folded in the first pipe 10 also has a high-temperature state of 200° C. to 250° C., a relatively large temperature difference that causes a sudden change in crystallinity does not occur around the boundary portion 53. Therefore, when the end surfaces 17, 27 are cooled down at a room temperature to around the glass transition temperature for 50 or more seconds in a state where they are pressurized at about 5 kN, it is possible to obtain the welding joined body 30 in which the crystallinity is uniform in a wide range around the joined portion 35, in other words, the welding joined body 30 having a relatively high low-temperature tensile strength with which the welding joined body 30 does not break until the welding joined body 30 reaches around the yield point.

As such, it can be said that the welding joining method of the present embodiment is to control the output of infrared in the heating and melting step so that a temperature difference between the weld bead 50 and the part 19 does not become relatively large (the temperature difference falls within a predetermined temperature difference). The weld bead 50 is discharged from the joined portion 35, and the part 19 is a part on which the weld bead 50 is folded in the first pipe 10.

Note that it is necessary that a relationship between the first predetermined time and the second predetermined time be set such that, in the end portions of the first and second pipes 10, 20, the heating range R1 (see FIG. 3) heated in the heating step is wider than the melting range R2 melted in the melting step. More specifically, a preferable range of the first predetermined time is 60 to 90 seconds, and a preferable range of the second predetermined time is 5 to 30 seconds.

Welding Joined Body

Next will be described the welding joined body 30 obtained by the welding joining method.

As described above, in the welding joining method of the present embodiment, after low-output infrared is emitted for the first predetermined time, high-output infrared is emitted for the second predetermined time, so that the crystallinity along the tubular radial direction in the region starting from the boundary portion 53 in the welding joined body 30 after cooling does not suddenly change, the boundary portion 53 being a part between the weld bead 50 and the inner peripheral surface 11 of the first pipe 10. In the welding joined body 30 obtained as such, the rate of change in crystallinity in the tubular radial direction in a belt-shaped predetermined region PA (see FIG. 11) extending outwardly in the tubular radial direction when it is viewed in the circumferential direction is a predetermined value or less. The predetermined region PA is set in the first pipe 10 so as to start from the boundary portion 53.

Note that the predetermined value is a value determined in advance based on experiment, experience, or the like. The predetermined value is a value that allows the tensile breaking strength of the welding joined body 30 to be 60% or more of the tensile breaking strength of the base material, for example, provided that the rate of change in crystallinity in the tubular radial direction in the predetermined region PA is the predetermined value or less.

The following describes details of a calculation method of the "rate of change in crystallinity" based on which it is determined whether or not such a relatively high low-temperature tensile strength is achieved, and a calculation method of "crystallinity" as a premise of the rate of change in crystallinity.

Crystallinity

Figure 9:
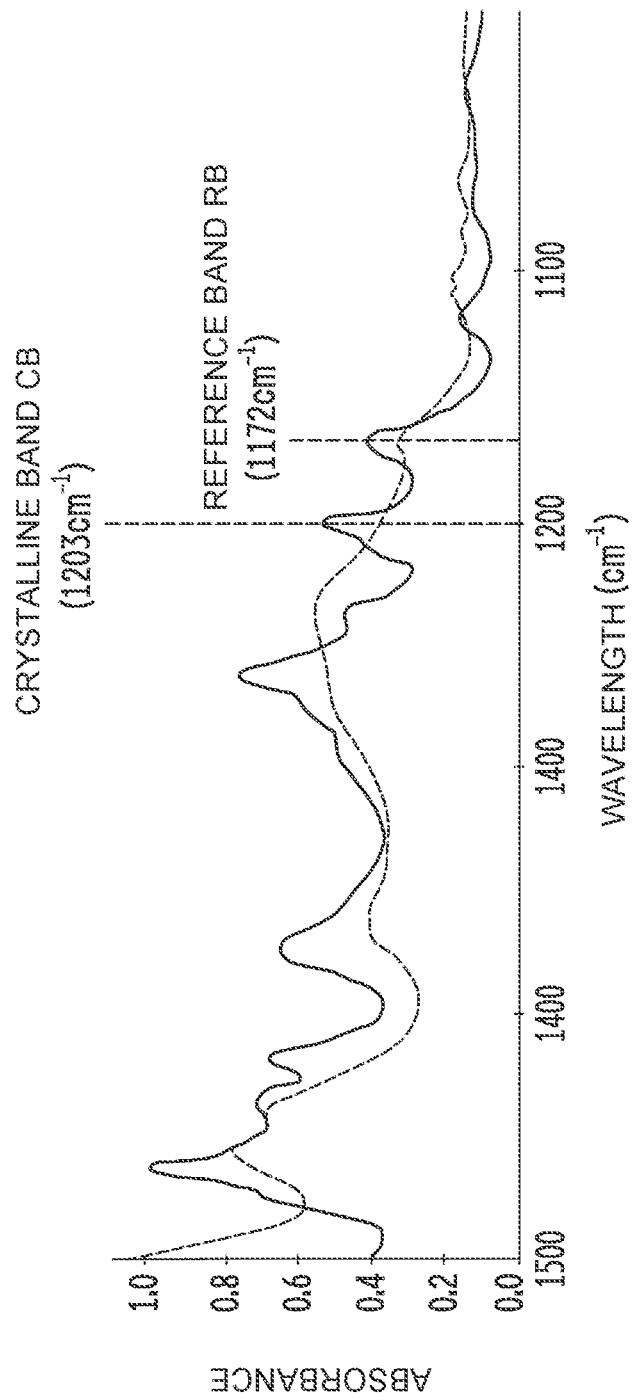
FIG. 9 is a view schematically illustrating a spectrum in a state where crystals are formed and a spectrum in a state where no crystal is formed.
Figure 10:
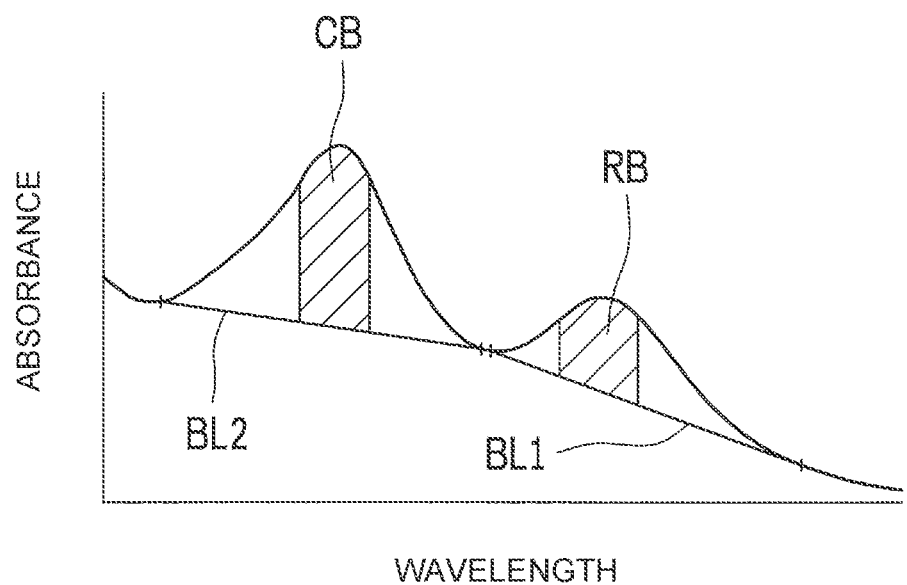
FIG. 10 is a view to schematically describe a method for digitizing the height of a peak.

FIG. 9 is a view schematically illustrating a spectrum in a state where crystals are formed and a spectrum in a state where no crystal is formed, and FIG. 10 is a view to schematically describe a method for digitizing the height of a peak. Note that, in FIG. 9, the spectrum in the state where crystals are formed is indicated by a continuous line, and the spectrum in the state where no crystal is formed is indicated by a broken line.

First, the "crystallinity" is determined relatively in comparison with the state where no crystal is formed. In view of this, as a target for the comparison, a state just before melting (250° C.) is created in the welding joined body 30. Here, the reason why the "state just before melting" is created is as follows. The state where no crystal is formed at all can be achieved at a melting point (270° C.) or more. However, when the welding joined body 30 in this state melts, the welding joined body 30 turns into a liquid phase, but the liquid phase cannot be compared with a solid phase. Accordingly, heating is stopped just before melting, so that a solid phase in which crystals are hardly formed is achieved.

Then, a spectrum in the state where crystals are formed (the welding joined body 30 at a room temperature) and a spectrum in the state where no crystal is formed (the welding joined body 30 at 250° C.), as illustrated in FIG. 9, are found by use of infrared spectroscopy. The infrared spectroscopy is a method using a phenomenon in which an amount of infrared to be absorbed in accordance with crystallinity varies depending on its wavelength. The infrared spectroscopy is generally known as a crystallinity distribution visualization method.

When the continuous line is compared with the broken line in FIG. 9, at a wavelength of 1172 cm$^{-1}$, the state where crystals are formed and the state where no crystal is formed have respective peaks of absorbance at the same position. That is, the wavelength of 1172 cm$^{-1}$ is a wavelength at which a peak easily occurs in the first place regardless of whether crystals are formed or not, and therefore, this wavelength is selected as a reference band RB.

In the meantime, at a wavelength of 1203 cm$^{-1}$, it is found that the broken line does not have a peak, whereas the absorbance of the continuous line largely changes. This is because the absorbance increases due to formation of crystals. Accordingly, this wavelength is selected as a crystalline band CB.

Then, the ratio of the crystalline band CB in which crystals are formed to the reference band RB in which no crystal is formed is found. Hereby, a degree of increase in absorbance due to formation of crystals, that is, the "crystallinity" can be obtained.

When the ratio of the absorbance of the crystalline band CB to the absorbance of the reference band RB is simply defined as the "crystallinity," the crystallinity is easily affected by noise.

In view of this, in the present embodiment, in order to eliminate the influence of noise, as illustrated in FIG. 10, the height of the absorbance of the reference band RB from a baseline BL1 obtained by connecting downward projections on the opposite sides of the reference band RB is taken as a peak height, and the height of the absorbance of the crystalline band CB from a baseline BL2 obtained by connecting downward projections on the opposite sides of the crystalline band CB is taken as a peak height. Then, the ratio of the peak height of the crystalline band CB to the peak height of the reference band RB is defined as the "crystallinity."

For example, the section of the test piece 70 (the welding joined body 30) as illustrated in FIG. 5 is divided into small square pixels with one side being set to 5.47 μm to 25 μm, and the "crystallinity" is calculated for each pixel. The pixels are separated by color in accordance with their crystallinities (values) (separated by type of hatching in the figures) and are imaged. Thus, the crystallinity distribution maps of FIGS. 7 and 8 are obtained.

Rate of Change in Crystallinity

As illustrated in FIGS. 7 and 8, from the imaged crystallinities, it is apparent that the crystallinity is highest in the boundary portion 53 between the inner peripheral surface 11 of the first pipe 10 and the weld bead 50 in the welding joined body 30 obtained by joining members made of crystalline resin by the infrared welding method. Even if the imaged crystallinities illustrated in FIGS. 7, 8 are referred to, it is not easy to determine whether or not the imaged crystallinities achieve a crystallinity distribution in which no breakage occurs at a relatively low tensile force in the low-temperature tensile test.

In view of this, in the present embodiment, the "rate of change in crystallinity" is digitized, so that a technique to stably determine a joined state in which breakage does not occur up to a point close to a yield point is to be provided.

More specifically, in the present embodiment, a belt-shaped region extending in the tubular radial direction when it is viewed in the circumferential direction is taken as a large region LA. The region is set in the first pipe 10 so as to include the boundary portion 53 between the weld bead 50 and the inner peripheral surface 11 of the first pipe 10. Each of a plurality of regions obtained by equally dividing the large region LA in the tubular radial direction is taken as a medium region MA. Each of a plurality of regions obtained by equally dividing each of the medium regions MA in the tubular axial direction such that the regions are arranged in the tubular axial direction is taken as a small region SA. Then, a value obtained by adding up crystallinities of the small regions SA included in each of the medium regions MA is taken as the crystallinity of the each of the medium regions MA. In this case, in the large region LA, a range which starts from the boundary portion 53 and in which the crystallinities of the medium regions MA linearly change in the tubular radial direction is set as a predetermined region PA. The inclination of an approximate straight line obtained by linearly approximating a crystallinity changing linearly within the predetermined region PA is defined as the "rate of change in crystallinity." Then, based on whether or not the inclination of the approximate straight line is the predetermined value or less, it is determined whether or not the welding joined body 30 has a relatively high strength and high quality.

Figure 11:
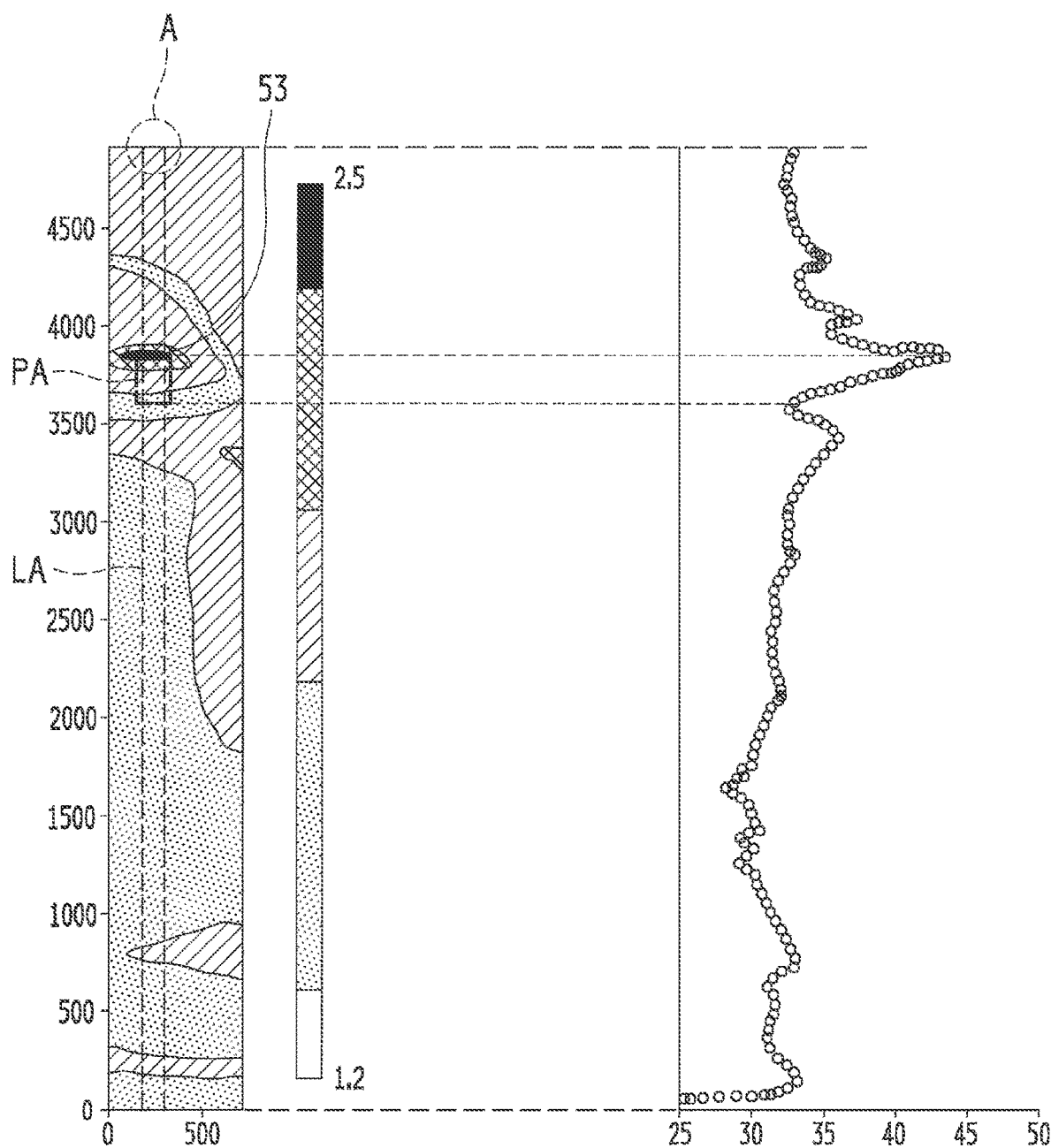
FIG. 11 is a view to schematically describe one example of a method for finding a rate of change in crystallinity.

FIG. 11 is a view to schematically describe one example of a method for finding a rate of change in crystallinity. First, as indicated by a broken frame on the left side in FIG. 11, the belt-shaped large region LA extending in the tubular radial direction when it is viewed in the circumferential direction is set in the first pipe 10 so that the large region LA includes the boundary portion 53 between the weld bead 50 and the inner peripheral surface 11 of the first pipe 10. Note that, in the example illustrated in FIG. 11, the width (the length in the tubular axial direction) of the large region LA is set to about 100 μm.

Figure 12:
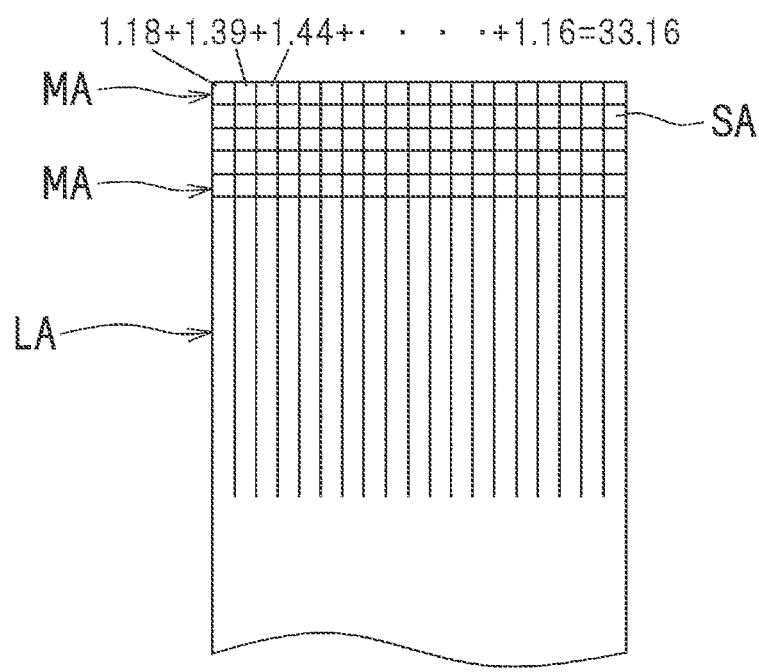
FIG. 12 is an enlarged view schematically illustrating a part A in FIG. 11.

FIG. 12 is an enlarged view schematically illustrating a part A in FIG. 11. As illustrated in FIG. 12, the medium regions MA obtained by equally dividing the large region LA in the tubular radial direction (e.g., at a pitch of 5.47 μm) are set. Subsequently, the small regions SA obtained by equally dividing each of the medium regions MA in the tubular axial direction (e.g., at a pitch of 5.47 μm) such that the small regions SA are arranged in the tubular axial direction are set.

That is, in this case, a region group where 19 small regions SA (pixels) each having a square shape with one side being set to 5.47 μm are arranged in the tubular axial direction constitutes the medium region MA having a rectangular shape in which the length in the tubular radial direction is 5.47 μm and the length in the tubular axial direction is about 100 μm, and a region group in which several medium regions MA are arranged in the tubular radial direction at a pitch of 5.47 μm constitutes the large region LA.

Note that the square small region SA with one side being set to 5.47 μm is just an example. In a case of a square small region SA with one side being set to 25 μm, for example, a region group where four small regions SA are arranged in the tubular axial direction constitutes a medium region MA having a rectangular shape in which the length in the tubular radial direction is 25 μm and the length in the tubular axial direction is about 100 μm, and a region group in which several medium regions MA are arranged in the tubular radial direction at a pitch of 25 μm constitutes the large region LA.

Subsequently, the crystallinity of each square small region SA with one side being set to 5.47 μm is calculated by the technique using the infrared spectroscopy described above. Subsequently, a value (33.16 in the example of FIG. 12) obtained by adding up the crystallinities (1.18, 1.39, 1.44, . . . in the example of FIG. 12) of the 19 small regions SA included in each medium region MA is calculated as the crystallinity of the each medium region MA. Thus, a graph obtained by plotting the crystallinities of the medium regions MA at respective positions of the medium regions MA in the tubular radial direction is a graph of crystallinity illustrated on the right side of FIG. 11.

Figure 13:
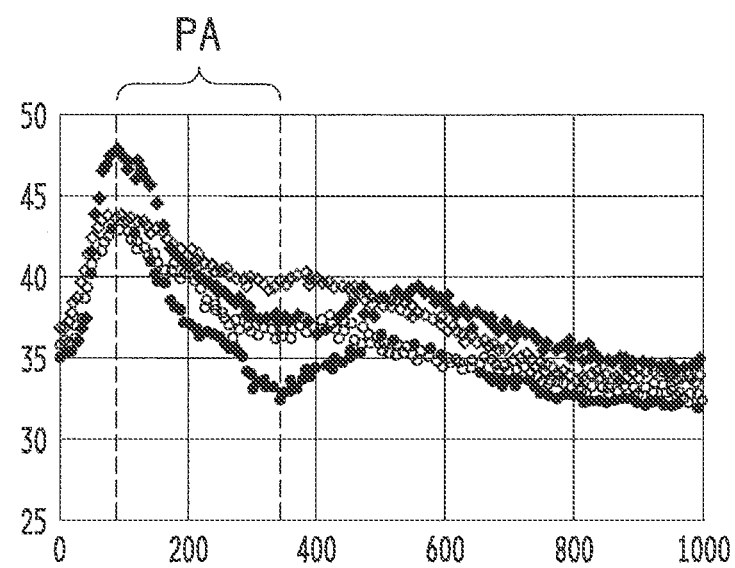
FIG. 13 is a graph of crystallinity in a large region.

FIG. 13 illustrates four graphs of crystallinity obtained by applying such a technique to four welding joined bodies obtained under different conditions for welding joining. Note that, among the four graphs of crystallinity illustrated in FIG. 13, graphs plotted by white circles and white diamonds relate to welding joined bodies 30 obtained by the welding joining method of the present embodiment. That is, the welding joined bodies 30 are obtained by joining such that, after low-output infrared is applied for 60 to 90 seconds at the time of heating and melting, high-output infrared is applied for 5 to 30 seconds. On the other hand, graphs plotted by black circles and black diamonds relate to welding joined bodies joined by techniques other than the welding joining method of the present embodiment.

It seems that no regularity is found from the four graphs of crystallinity illustrated in FIG. 13. However, it is found that, in a range from the boundary portion 53 (a position of about 90 μm) toward a position of 350 μm in the tubular radial direction, all the crystallinities of the four graphs largely change linearly in the tubular radial direction. As such, in the large region LA, a range which starts from the boundary portion 53 and in which the crystallinity largely changes linearly in the tubular radial direction, in other words, a range that clearly and largely affects whether or not the welding joined body 30 has a relatively high tensile strength is set as the predetermined region PA. Four graphs of crystallinity illustrated in FIG. 14 are graphs obtained such that only the predetermined region PA is enlarged in the tubular radial direction and graphed.

Figure 14:
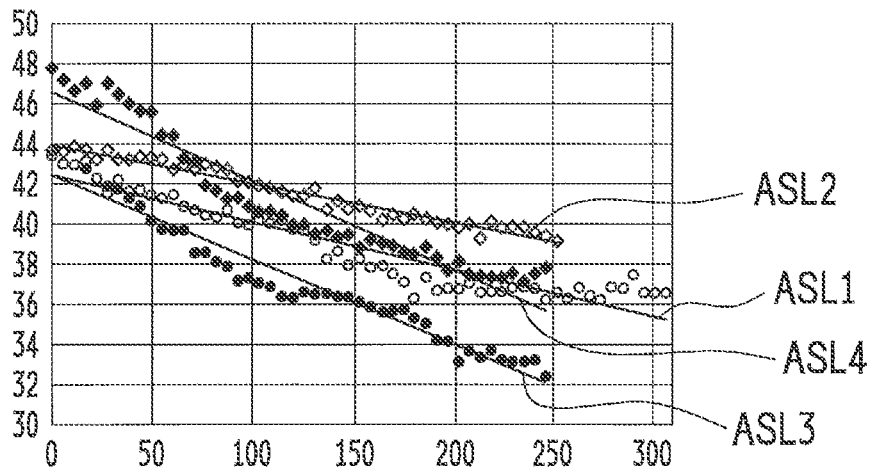
FIG. 14 is a graph of crystallinity in a predetermined region.

In terms of the four graphs of crystallinity, FIG. 14 illustrates four approximate straight lines ASL1 to ASL4 obtained by linearly approximating respective crystallinities changing linearly within the predetermined region PA, by use of a least-squares method or the like. From FIG. 14, the following fact is found. That is, the approximate straight lines ASL1, ASL2 of the graphs plotted by white circles and white diamonds according to the welding joining method of the present embodiment have relatively small inclinations, whereas the approximate straight lines ASL3, ASL4 of the graphs plotted by black circles and black diamonds according to the techniques other than the welding joining method of the present embodiment have relatively large inclinations. In view of this, in the present embodiment, the inclination of an approximate straight line is defined as a "rate of change in crystallinity," and based on whether or not the inclination of the approximate straight line is a predetermined value or less, it is determined whether or not the welding joined body 30 has a relatively high strength and high quality.

Figure 15:
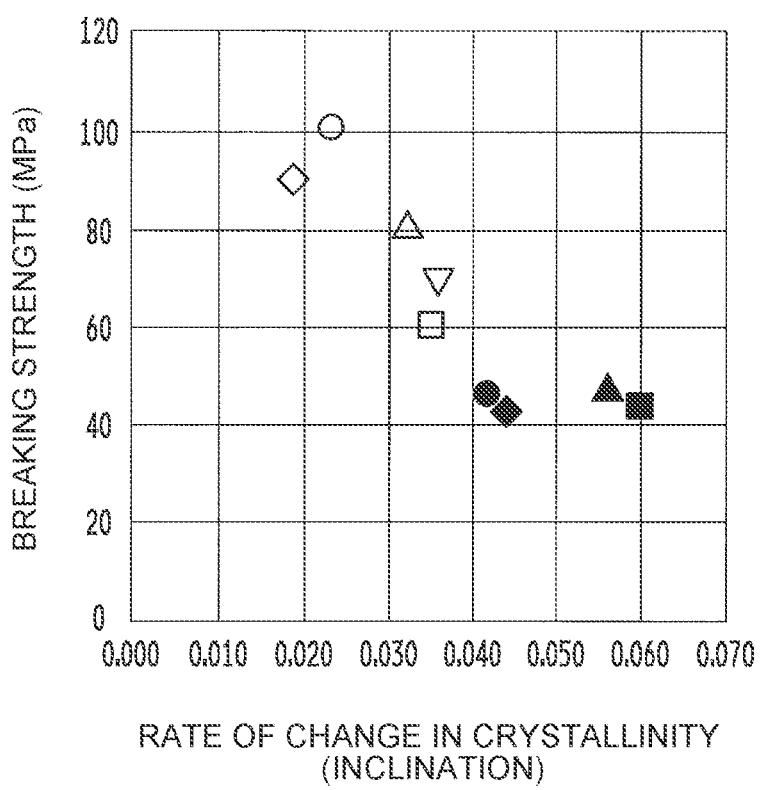
FIG. 15 is a graph illustrating a relationship between rate of change in crystallinity and tensile breaking strength.

FIG. 15 is a graph illustrating a relationship between rate of change in crystallinity and tensile breaking strength. Note that, in FIG. 15, respective inclinations of approximate straight lines indicated by a white circle, a white diamond, a white reverse triangle, a white triangle, and a white square relate to the welding joined bodies 30 obtained by joining by the welding joining method of the present embodiment, whereas respective inclinations of approximate straight lines indicated by a black circle, a black diamond, a black triangle, and a black square relate to welding joined bodies obtained by joining by techniques other than the welding joining method of the present embodiment. Particularly, the inclination of the approximate straight line indicated by the white circle is the inclination of the approximate straight line ASL1 in FIG. 14, the inclination of the approximate straight line indicated by the white diamond is the inclination of the approximate straight line ASL2 in FIG. 14, the inclination of the approximate straight line indicated by the black circle is the inclination of the approximate straight line ASL3 in FIG. 14, and the inclination of the approximate straight line indicated by the black diamond is the inclination of the approximate straight line ASL4 in FIG. 14.

As illustrated in FIG. 15, in the welding joined bodies 30 obtained by joining by the welding joining method of the present embodiment, it is found that their tensile breaking strengths are all 60% (=60 MPa) or more of the tensile breaking strength (=100 MPa) of the base material, and the inclinations of the approximate straight lines of the welding joined bodies 30 are all 0.040 or less. In the meantime, in the welding joined bodies obtained by joining by the techniques other than the welding joining method of the present embodiment, it is found that their tensile breaking strengths are all less than 60% of the tensile breaking strength of the base material, and the inclinations of the approximate straight lines of the welding joined bodies all exceed 0.040.

As such, the welding joining method of the present embodiment is to control the output of infrared so that the crystallinity along the tubular radial direction in the region starting from the boundary portion 53 in the welding joined body 30 after cooling does not change rapidly, and in the welding joined body 30 to which the welding joining method of the present embodiment is applied, the rate of change in crystallinity in the tubular radial direction in the predetermined region PA is the predetermined value (=0.040) or less, so that a relatively high tensile strength can be achieved.

Conversely, in a case where the rate of change in crystallinity in the tubular radial direction in the predetermined region PA of the welding joined body 30 is the predetermined value or less, it can be estimated that the welding joined body 30 is manufactured by use of the welding joining method of the present disclosure.

Note that the predetermined value=0.040 is an inclination when 19 small regions SA are set in the medium region MA. Even in a case where the number of small regions SA set in the medium region MA is 18 or less or 20 or more, there are corresponding predetermined values that allow the tensile breaking strength to be 60% or more of the tensile breaking strength of the base material when their rates of change in crystallinity are the corresponding predetermined values or less. It can be said that the welding joined bodies 30 configured such that their rates of change in crystallinity in the tubular radial direction in respective predetermined regions PA are their corresponding predetermined values or less are included in the scope of the present disclosure.

Embodiment 2

The present embodiment is different from Embodiment 1 in that the property of infrared (the wavelength of infrared) is changed. The following mainly describes points different from Embodiment 1.

FIG. 16 is a graph illustrating a relationship between wavelength and strength in the infrared radiation lamp 40. The infrared emitted from the infrared radiation lamp 40 is not constituted by a single waveband. The infrared includes various long and short wavebands regardless of whether the infrared is low-output infrared as indicated by a continuous line in FIG. 16 or high-output infrared as indicated by a broken line in FIG. 16. The infrared emitted from the same infrared radiation lamp 40 has a peak at generally the same waveband regardless of whether the output of the infrared is high or low, as illustrated in FIG. 16.

As can be seen from FIG. 16, as compared to the low-output infrared, in the high-output infrared, a relative difference between the strength of the peak and the strength other than the peak is large. Accordingly, the ratio of a short waveband to a long waveband tends to be relatively high as compared to the low-output infrared. In view of this, in Embodiment 1, the high-output infrared to melt the joining surfaces 17, 27 has a relatively high strength at its peak, and therefore, the ratio of the short waveband to the long waveband is relatively high. In the meantime, the low-output infrared to uniformize a temperature distribution in the vicinity of the joined portion 35 has a relatively low strength at its peak. Accordingly, the ratio of the long waveband to the short waveband should be relatively high.

Further, it is known that near-infrared having a relatively short wavelength shallowly and quickly passes heat through an irradiation target object so that a surface temperature of the irradiation target object is raised rapidly, whereas far-infrared having a relatively long wavelength can deeply and slowly pass heat through the irradiation target object.

In view of this, regardless of whether the output of infrared is high or low, when far-infrared is mainly applied to the end portions 15, 25 of the first and second pipes 10, 20, the temperature distribution in the vicinity of the joined portion 35 can be made uniform, and when near-infrared is mainly applied to the end portions 15, 25 of the first and second pipes 10, 20, the joining surfaces 17, 27 can be melted at a stretch, so that a high-quality joined state should be obtained.

In view of this, in the welding joining method of the present embodiment, an infrared emission unit configured to change the peak of the wavelength of infrared to be emitted from a near-infrared region (from 0.7 μm) to a far-infrared region (to 1.0 mm) is prepared. Then, in the heating step, the end portions 15, 25 of the first and second pipes 10, 20 are heated by mainly emitting far-infrared from the infrared emission unit for a predetermined time, and meanwhile, in the melting step, the joining surfaces (end surfaces) 17, 27 of the first and second pipes 10, 20 are melted by mainly emitting near-infrared from the infrared emission unit for a time shorter than the predetermined time.

More specifically, in a case where the first pipe 10 and the second pipe 20 each made of polyamide resin having a plate thickness of 4 mm are brought into contact with each other and joined to each other, first, far-infrared with a wavelength peak of about 500 μm is emitted from the infrared emission unit for the predetermined time, so that the end portions 15, 25 of the first and second pipes 10, 20 are deeply and slowly warmed, and thus, a range of about 4 mm from the end surfaces 17, 27 is heated. Then, after a target region reaches a uniform temperature, near-infrared with a wavelength peak of about 1.5 μm is emitted from the infrared emission unit for a time shorter than the predetermined time, so that a range of about 2 mm from the end surfaces 17, 27 is melted at a stretch.

After that, similarly to Embodiment 1, the molten end surfaces 17, 27 of the first and second pipes 10, 20 are brought into close contact with each other in two seconds after heating is completed, and when the end surfaces 17, 27 are cooled down at a room temperature to around the glass transition temperature for 50 or more seconds in a state where they are pressurized at about 5 kN, it is possible to obtain the welding joined body 30 having a relatively high low-temperature tensile strength.

Thus, it may be said that the welding joining method of the present embodiment is to control the wavelength of infrared in the heating and melting step so that a temperature difference between the weld bead 50 and the part 19 does not become relatively large (the temperature difference falls within a predetermined temperature difference). The weld bead 50 is discharged from the joined portion 35, and the part 19 is a part on which the weld bead 50 is folded in the first pipe 10.

OTHER EMBODIMENTS

The present disclosure is not limited to the above embodiments and can be carried out in other various forms without departing from the spirit or main feature of the present disclosure.

In Embodiment 1, low-output infrared is switched to high-output infrared in the heating and melting step. However, the present disclosure is not limited to this, provided that the crystallinity along the tubular radial direction in the region starting from the boundary portion in the welding joined body 30 after cooling does not suddenly change. For example, after low-output infrared is switched to medium-output infrared, the medium-output infrared may be switched to high-output infrared.

Further, in Embodiment 2, far-infrared is switched to near-infrared in the heating and melting step. However, the present disclosure is not limited to this, provided that the crystallinity along the tubular radial direction in the region starting from the boundary portion in the welding joined body 30 after cooling does not suddenly change. For example, after far-infrared is switched to mid-infrared, the mid-infrared may be switched to near-infrared.

Further, the above embodiments describe a case where the weld bead 50 is folded on the inner peripheral surface 11 of the first pipe 10. However, the present disclosure is not limited to this. Similar techniques can be also applied to a case where the weld bead 50 is folded on the inner peripheral surface 21 of the second pipe 20 or a case where the weld bead 50 is folded on the inner peripheral surfaces 11, 21 of the first and second pipes 10, 20.

Thus, the above embodiments are just examples in every respect and must not be interpreted restrictively. Further, modifications and alterations belonging to an equivalent range of Claims are all included in the present disclosure.

With the present disclosure, it is possible to achieve a relatively high tensile strength even in a case where members made of crystalline resin are joined to each other by an infrared welding method. Accordingly, the present disclosure is extremely useful when the present disclosure is applied to a welding joining method for joining tubular members made of crystalline resin to each other and to a welding joined body.

What is claimed is:

1. A welding joined body including a joined portion obtained by bonding, by pressure, end portions of tubular members made of crystalline resin to each other in a molten state, wherein:
   a weld bead remains in a vicinity of the joined portion and in a shape folded onto an inner peripheral surface of one of the tubular members from a root of the weld bead, the weld bead being discharged from the joined portion in pressure bonding such that the weld bead projects inwardly in a tubular radial direction and falls down toward the one of the tubular members;
   a rate of change in crystallinity in the tubular radial direction in a belt-shaped predetermined region extending outwardly in the tubular radial direction when the predetermined region is viewed in a circumferential direction is a predetermined value or less, the predetermined region being set in a corresponding one of the tubular members so as to start from a boundary portion between the weld bead and the inner peripheral surface of the corresponding one of the tubular members.

2. The welding joined body according to claim 1, wherein: when a belt-shaped region extending in the tubular radial direction when the belt-shaped region is viewed in the circumferential direction is taken as a large region, the belt-shaped region being set in the corresponding one of the tubular members so as to include the boundary portion between the weld bead and the inner peripheral surface of the corresponding one of the tubular members, a plurality of regions obtained by equally dividing the large region in the tubular radial direction is taken as medium regions, a plurality of regions obtained by equally dividing each of the medium regions in a tubular axial direction such that the regions are arranged in the tubular axial direction is taken as small regions, and a value obtained by adding up crystallinities of the small regions included in the each of the medium regions is taken as a crystallinity of the each of the medium regions, the predetermined region is set in a range, in the large region, which starts from the boundary portion and in which crystallinities of the medium regions linearly change in the tubular radial direction; and
   the rate of change in crystallinity is an inclination of an approximate straight line obtained by linearly approximating the crystallinities changing linearly within the predetermined region.

* * * * *